United States Patent [19]

Ohzu et al.

[11] Patent Number: 5,019,702

[45] Date of Patent: May 28, 1991

[54] PHOTOELECTRIC TRANSDUCER APPARATUS HAVING A PLURALITY OF TRANSDUCER ELEMENTS AND A PLURALITY OF CAPACITOR ELEMENTS

[75] Inventors: Hayao Ohzu, Fuchu; Toshiji Suzuki, Machida; Akira Ishizaki, Yokohama; Nobuyoshi Tanaka, Tokyo; Shigetoshi Sugawa, Atsugi; Seiji Hashimoto, Yokohama; Tadanori Harada, Hiratsuka, all of Japan

[73] Assignee: Canon Kabushiki Kaisha, Tokyo, Japan

[21] Appl. No.: 587,647

[22] Filed: Sep. 25, 1990

Related U.S. Application Data

[63] Continuation of Ser. No. 314,275, Feb. 23, 1989, abandoned, which is a continuation of Ser. No. 929,892, Nov. 13, 1986, abandoned.

[30] Foreign Application Priority Data

| Nov. 15, 1985 | [JP] | Japan | 60-255027 |
| Nov. 29, 1985 | [JP] | Japan | 60-269882 |
| Oct. 8, 1986 | [JP] | Japan | 61-238017 |

[51] Int. Cl.$^5$ .................................. H01J 40/14
[52] U.S. Cl. ........................ 250/208.1; 358/213.31
[58] Field of Search .................. 250/578, 208.1; 357/30 H; 358/213.16, 213.31, 213.26

[56] References Cited

U.S. PATENT DOCUMENTS

| 3,904,818 | 9/1975 | Kovac | 358/213.16 |
| 4,380,755 | 4/1983 | Endlicher et al. | |
| 4,463,383 | 7/1984 | Soneda et al. | 250/578 |
| 4,511,804 | 4/1985 | Ozawa | 250/578 |
| 4,571,624 | 2/1986 | Nishizawa et al. | 250/578 |
| 4,573,077 | 2/1986 | Imai | 250/578 |
| 4,678,938 | 7/1987 | Nakamura | 250/578 |
| 4,686,554 | 8/1987 | Ohmi et al. | 357/30 |

FOREIGN PATENT DOCUMENTS

| 0027881 | 5/1981 | European Pat. Off. |
| 0078038 | 5/1983 | European Pat. Off. |
| 58-111579 | 7/1983 | Japan |
| 59-144169 | 8/1984 | Japan |

OTHER PUBLICATIONS

"100×100 CID Imager With Integrated Fixed Pattern Noise Suppression", Rudolf Koch and Heiner Herbst, 9/79.

*Primary Examiner*—David C. Nelms
*Assistant Examiner*—Khaled Shami
*Attorney, Agent, or Firm*—Fitzpatrick, Cella, Harper & Scinto

[57] ABSTRACT

In a photoelectric transducer apparatus having a plurality of photoelectric transducer elements each having a capacitor electrode formed on a control electrode of a corresponding semiconductor transistor, the apparatus being adapted to sequentially select each element in units of lines, to control a potential of the control electrode of the selected photoelectric transducer element through the capacitor electrode, to store carriers in the control electrode region, and to read out a signal component corresponding to the amount of charge, the apparatus includes: optical information storing memory for storing optical information read out from the photoelectric transducer element; and dark voltage storing memory for storing a voltage corresponding to a dark voltage read out from the photoelectric transducer element, and actual optical information stored in the optical information storing memory and information corresponding to the dark voltage component stored in the dark voltage storing memory are simultaneously read out onto different information output lines.

1 Claim, 13 Drawing Sheets

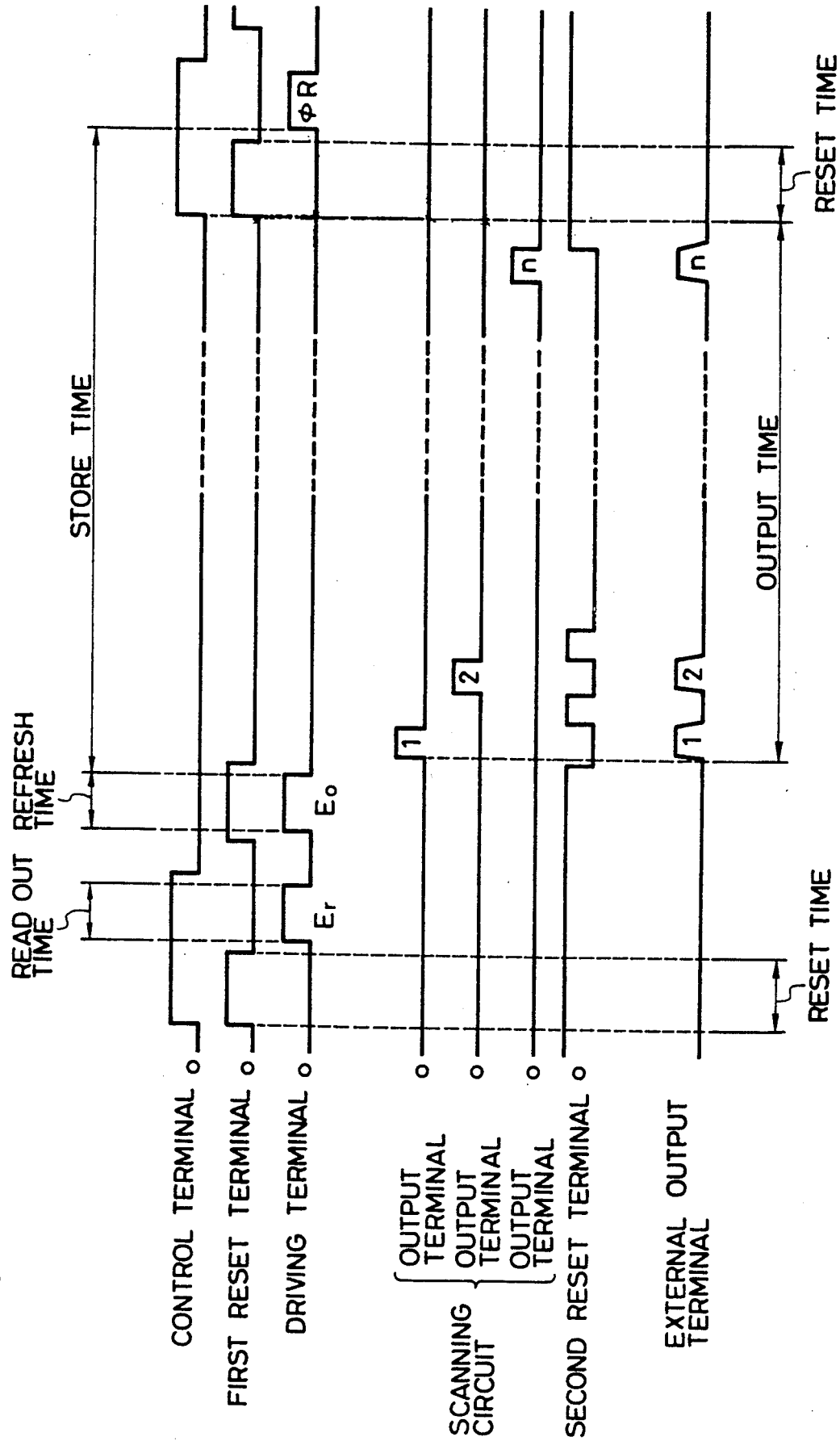

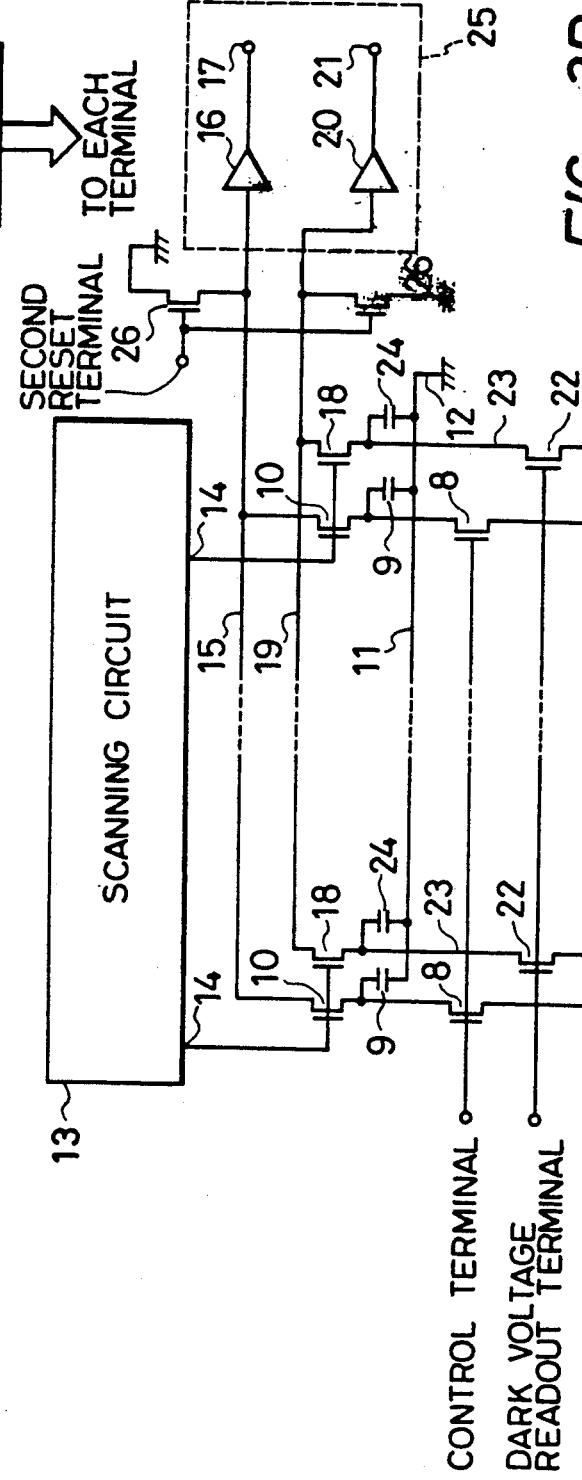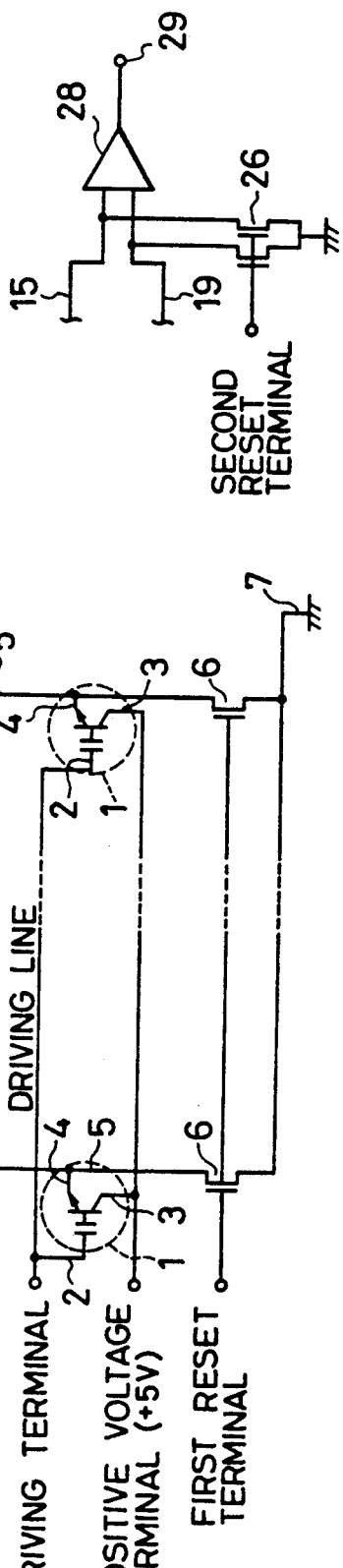

PHOTOELECTRIC TRANSDUCER APPARATUS HAVING A PLURALITY OF TRANSDUCER ELEMENTS AND A PLURALITY OF CAPACITOR ELEMENTS

This application is a continuation of application Ser. No. 314,275, filed Feb. 23, 1989, now abandoned which is a continuation of Ser. No. 06/929,892, filed Nov. 13, 1986, both of which are now abandoned.

BACKGROUND OF THE INVENTION

1. Field of the Invention

The present invention relates to a photoelectric transducer apparatus and, more particularly, to a photoelectric transducer apparatus having a plurality of photoelectric transducer elements each having a capacitor electrode on a control electrode region of a corresponding semiconductor transistor.

2. Related Background Art

A TV or SV camera with an image sensor such as a CCD or MOS sensor has an aperture mechanism. Photoelectric transducer apparatuses each having a TV or SV camera with an automatic aperture mechanism are described in Japanese Patent Disclosure (Kokai) Nos. 12759/1985 to 12765/1985.

This photoelectric transducer apparatus includes a photosensor having a plurality of sensor cells each having a capacitor formed on a control electrode of a corresponding semiconductor transistor.

In the conventional photoelectric transducer apparatus described above, noise is often mixed in an output signal read out from the photosensor cells due to variations in dark voltage generated in the cells within arbitrary store time.

An output signal corresponding to the dark current component generated within the photosensor cell is prestored as reference optical information in an external memory in a conventional apparatus. A reference output signal derived from the reference optical information and an output signal from the actual optical information read out from the photosensor cell are compared with each other, and the output signal of the actual optical information is corrected, thereby eliminating the noise component caused by the dark voltage.

In the conventional photoelectric transducer apparatus described above, in order to constitute a photoelectric transducer system, the resultant system is undesirably complicated since a separate external circuit including a noise removal memory is required.

When a conventional photoelectric transducer apparatus is applied to a video camera or the like, the following problem occurs. When photoelectric transducer cells are arranged in a two-dimensional matrix and scanned in the vertical and horizontal directions, holes are stored in the base of each photoelectric transducer cell in a store mode upon reception of strong light. The base potential is forward-biased with respect to the emitter potential. The potential of a vertical line connected to the emitter electrode of each photoelectric transducer cell receiving strong light is increased to cause a blooming phenomenon. In order to prevent this, it is proposed that the vertical lines are grounded for a period excluding the readout operation, thereby refreshing the charge overflowed onto the vertical line. However, the vertical line can be grounded for only the horizontal blanking period, i.e., about 10 μs. Therefore, the charge overflowed onto the vertical line during the horizontal scanning period still causes the blooming phenomenon.

In the readout mode, when imade signals are sequentially output by horizontal scanning after they are stored in a vertical line, a dummy signal is generated during the store of the signal in the vertical line. In other words, a smear phenomenon occurs.

In addition, the period for performing the refresh operation in the conventional apparatus is about 10 μs in the horizontal blanking period. The refresh time is short to result in incomplete refreshing and hence an after image phenomenon.

Furthermore, assume that when the conventional photoelectric transducer apparatus is used as a single-plate type solid-state imaging device in a color television video camera, color filters are deposited or adhered onto the pixels. If an alignment scheme such as a Bayer alignment is used to form vertical lines in units of colors, i.e., R, G, and B, at least two vertical lines are required for the pixels of each column. In this case, since the vertical line portion does not serve as the photosensitive portion, the light-receiving area is reduced by the two vertical lines for each column. In other words, the opening of the aperture is undesirably reduced.

In a conventional photosensitive transducer apparatus, negative and positive voltages are required to bias an output amplifier, and the constitution is thus complicated. It is difficult to read out the signal component without degrading the frequency characteristics.

SUMMARY OF THE INVENTION

It is an object of the present invention to provide a photoelectric transducer apparatus capable of solving the conventional drawbacks described above.

It is another object of the present invention to provide a simple photoelectric transducer apparatus capable of eliminating variations in dark voltage.

It is still another object of the present invention to provide a photoelectric transducer apparatus comprising optical information storing means for storing optical information read out from a photoelectric transducer element and dark voltage storing means for storing a voltage corresponding to a dark voltage component read out from the photoelectric transducer element, wherein actual optical information stored in the optical information storing means is simultaneously read out together with the dark voltage component stored in the dark voltage storing means onto separate output lines, thereby correcting the information corresponding to the dark voltage in units of optical sensor cells and hence removing noise caused by variations in dark voltage from the output signal from the photosensor cells.

In order to achieve the above object, according to an aspect of the present invention, there is provided a photoelectric transducer apparatus having a plurality of photoelectric transducer elements each having a capacitor electrode formed on a control electrode of a corresponding semiconductor transistor, the apparatus being adapted to sequentially select each element in units of lines, to control a potential of the control electrode of the selected photoelectric transducer element through the capacitor electrode, to store carriers in the control electrode region, and to read out a signal component corresponding to the amount of charge stored in the control electrode region, comprising optical information storing means for storing optical information read out from the photoelectric transducer element; and dark voltage storing means for storing a voltage corresponding to a dark voltage read out from the photoelectric transducer element, wherein actual optical information stored in the optical information storing means and information corresponding to the dark voltage component stored in the dark voltage storing means are simultaneously read out onto different information output lines.

The information corresponding to the dark voltage component stored in the dark voltage storing means is read out onto the information output line therefor, and at the same time the information corresponding to the dark voltage is corrected in units of photosensor cells, thereby eliminating noise caused by variations in dark voltage.

The noise corresponding to the dark voltage component can, therefore, be processed within the sensor. An external circuit or the like need not be used to constitute a system configuration, thereby obtaining a low-cost photoelectric transducer apparatus.

It is still another object of the present invention to provide an imaging element and an apparatus using the same, wherein the after image, blooming, and smearing can be prevented with a simple construction.

It is still another object of the present invention to provide a color imaging element having a large aperture.

In order to achieve these objects, according to another aspect of the present invention, there is provided a photoelectric transducer apparatus comprising, a plurality of photoelectric transducer cells;

a signal read line for reading out signals from the plurality of photoelectric transducer elements; and a plurality of capacitors for selectively storing the signals read out through the signal read line.

According to this aspect of the present invention, since the plurality of capacitors for selectively storing the signals read out through the signal read line are provided, the image signal appearing on the vertical line can be shortened, thereby reducing the frequency of occurrence of the blooming and smearing phenomena. Since the capacitor can be disconnected from the pixel after the image signal is stored in the capacitor, the refresh time can be prolonged to reduce the occurrence of the after image phenomenon. In addition, if the photoelectric transducer apparatus is used in a color video camera, the number of capacitors can be that of the color signals of the row pixels, and only one vertical line is used, thereby increasing the aperture.

It is still another object of the present invention to provide a photoelectric transducer apparatus wherein a single power source can be used without degrading the signal component of the read signal.

In order to achieve the above object, according to still another aspect of the present invention, there is provided a photoelectric transducer apparatus for reading out a read signal from a photoelectric transducer element through an amplifier after the read signal is temporarily stored in a storing means, comprising switching means for properly applying a bias voltage to the storing means.

With the above arrangement, the reference potential of the store capacitor can be properly changed to use a single power source without degrading the signal component of the read signal.

It is still another object of the present invention to provide a photoelectric transducer apparatus with greatly reduced smearing or blooming.

In order to achieve the above object, according to still another aspect of the present invention, a capacitor is arranged in a vertical signal line through a switch to store the signal from the photoelectric transducer cell in the capacitor, thereby resetting the vertical signal line, so that the signal component in the capacitor is free from smearing or blooming.

BRIEF DESCRIPTION OF THE DRAWINGS

FIG. 2 is a timing chart for explaining the operation of the apparatus in FIG. 1;

FIG. 3A is a circuit diagram of a photoelectric transducer apparatus according to a second embodiment of the present invention;

FIG. 3B is a circuit diagram showing the main part of a third embodiment;

DETAILED DESCRIPTION OF THE PREFERRED EMBODIMENTS

Figure 1:
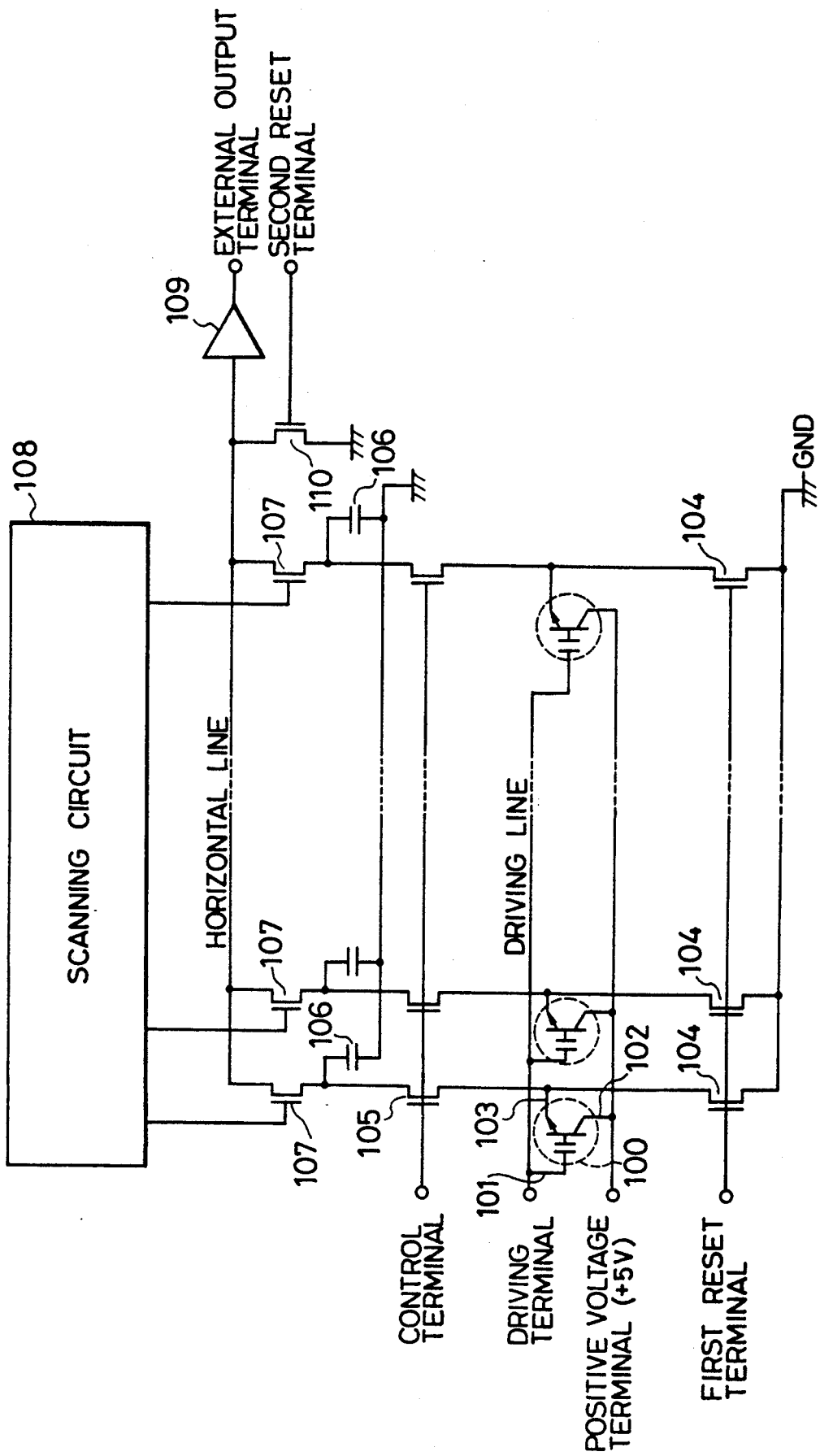
FIG. 1 is a circuit diagram of a photoelectric transducer apparatus according to a first embodiment of the present invention.

FIG. 1 is a circuit diagram of a photoelectric transducer apparatus as a line sensor according to a first embodiment of the present invention, and FIG. 2 is a timing chart for explaining the operation thereof.

Referring to FIGS. 1 and 2, capacitor electrodes 101 of photosensor cells 100 are commonly connected to a driving line, and collector electrodes 102 thereof are commonly connected to a positive voltage terminal.

A driving terminal is connected to the driving line.

A pulse signal is applied to the driving terminal to drive the photosensor cells 100. Emitter terminals 103 of the photosensor cells 100 are connected to vertical signal lines and commonly connected to each other through reset FETs 104. The emitter terminals 103 are connected to a ground terminal GND.

The gate electrodes of the FETs 104 are commonly connected to a first reset terminal.

The FETs 104 are switching field effect transistors.

The vertical signal lines are connected to store capacitors 106 through FETs 105 and to the source electrodes of FETs 107. The drain electrodes of the FETs 107 are commonly connected to a horizontal signal line. The gate electrodes of the FETs 105 are commonly connected to a control terminal.

The gate electrodes of the FETs 107 are respectively connected to output terminals of a scanning circuit 108.

Horizontal signal lines are connected to an external output terminal through an output amplifier 109 and to the ground terminal GND through FETS 104, 105, 107.

The gate terminal of the FET 110 is connected to a second reset terminal.

The FET 110 is a field effect transistor for resetting the horizontal line.

The operation of the circuit in FIG. 1 will be described with reference to a timing chart in FIG. 2.

The control and first reset terminals are simultaneously set at H level during the reset time. During the reset time, the optical information stored in the store capacitors 106 is discharged through the FETs 104.

When the control terminal is set at H level and the first reset terminal is set at L level, the optical information stored in the photosensor cells 100 is read out onto the vertical signal lines by applying the readout pulse signal to the driving terminal. Therefore, the optical information is stored in the store capacitors 106.

In this manner, when the readout pulse signal is set at H level, readout operation of the photosensor cells 100 is started. After the lapse of a predetermined period of time, the readout pulse signal is set at L level, thereby terminating the readout operation.

When the control terminal is set at L level, and the first reset and driving terminals are set at H level, the refresh operation state is obtained. The optical information stored in the photosensor cells 100 is erased through the FETs 104.

When the refresh pulse signal is set at L level, the refresh operation is ended.

Thereafter, during the period until the readout operation state is obtained again, the store time for storing the carriers in the photosensor cells 100 is defined.

The signal pulses from the output terminals of the scanning circuit 108 are used to sequentially turn on the FETs 107 according to the shift timings.

The optical information signals stored in the store capacitors 106 are sequentially read out onto the horizontal lines by horizontal scanning of the scanning circuit 108. The readout signals are amplified by the output amplifier 109 and appear at the external output terminal.

When all optical information signals stored in the store capacitors 106 are read out completely, the reset time is initialized again.

The above operations are thus repeated.

With the above arrangement, the signal charge is not kept on the vertical signal line for a long period of time, thus reducing blooming and smearing.

A second embodiment of the present invention will be described with reference to the accompanying drawings.

FIG. 3 is a circuit diagram of a photoelectric transducer apparatus according to the second embodiment.

Referring to FIG. 3, photosensor cells 1 as the photoelectric transducer elements are one-dimensionally arranged.

Capacitor electrodes 2 of the photosensor cells 1 are commonly connected to a driving line and to a driving terminal. Collector electrodes 3 of the photosensor cells 1 are commonly connected to a positive voltage terminal.

Emitter electrodes 4 of the photosensor cells 1 are respectively connected to vertical lines 5. The vertical lines 5 are commonly connected through FETs 6. The FETs 6 are connected to a ground terminal 7.

The gate electrodes of the FETs 6 are commonly connected to a first reset terminal.

The capacitors 9 and the source electrodes of the FETs 100 are respectively connected to the vertical lines 5 through FETs 8. The capacitors 9 are connected to a ground terminal 12 through a ground line 11.

The capacitors 9 are signal charge store capacitors, respectively.

The gate electrodes of the FETs 10 are respectively connected to output terminals 14 of the scanning circuit 13. The drain electrodes of the FETs 10 are connected to an output amplifier 16 through a horizontal line 15. The output terminal of the output amplifier 16 is connected to an external output terminal 17, so that an output voltage is extracted from the external output terminal 17.

The gate electrodes of the FETs 10 are respectively connected to the gate electrodes of FETs 18. The drain electrodes of the FETs 18 are connected to an output amplifier 20 through an output line 19.

The output terminal of the output amplifier 20 is connected to an external output terminal 21, so that an output voltage is extracted from the external output terminal 21.

The source electrodes of the FETs 18 are connected to the vertical lines 5 through FETs 22.

In the above embodiment, one electrode of each of capacitors 24 is connected between a corresponding one of the source electrodes of the FETs 18 and a corresponding one of the FETs 22 through a corresponding one of vertical lines 23. The other electrode of each of the capacitors 24 is connected to the ground line 11.

The capacitors 24 serve as dark voltage store capacitors, respectively. Reset FETs 26 are connected between the lines 15 and 19 and ground, respectively. The gate electrodes of the FETs 26 are connected to the second reset terminal. A control circuit 27 supplies timing pulses (FIG. 4) to the respective terminals.

The operation of the above embodiment will be described below.

Figure 4:
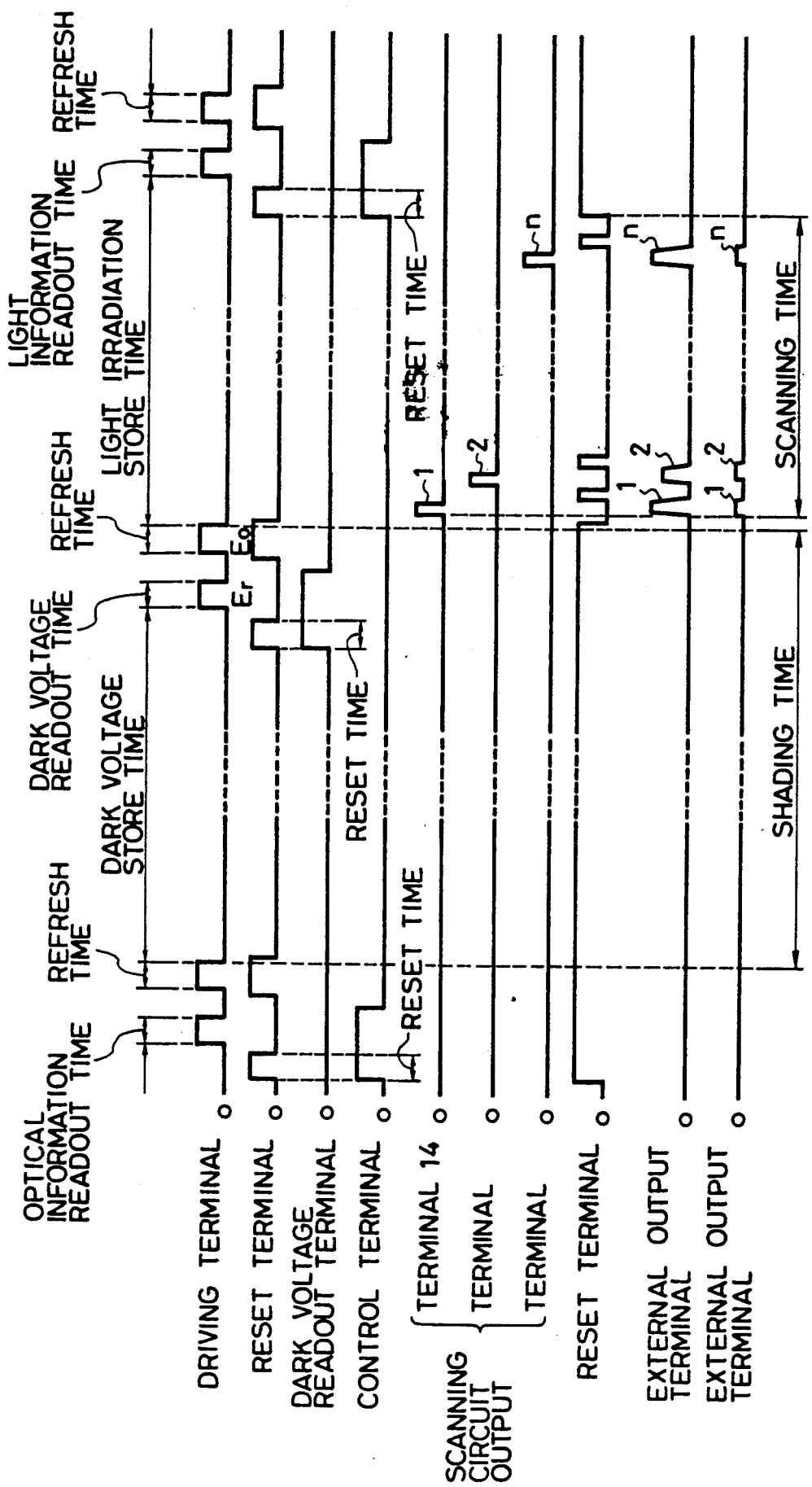
FIG. 4 is a timing chart for explaining the operation of the second and third embodiments of the present invention.

As shown in the timing chart of FIG. 4, the photosensor cells store optical information corresponding to the amounts of light in a light store operation during the light irradiation store time.

During a predetermined period of time until the light information readout, the photosensor cells 1 perform store operations of carriers upon light irradiation. During the reset time, both the control and first reset terminals are set at H level, so that the charges stored in the capacitors 9 are reset through the corresponding FETs 6.

The control terminal is set at H level, and the first reset terminal is set at L level. When a readout pulse voltage is applied to the driving terminal, the optical or light information stored in the photosensor cells 1 is read out onto the vertical lines, and the light information is stored in the capacitors 9.

When the light information readout time has elapsed, the first reset terminal is set at H level and the control terminal is set at L level. In this state, when the refresh pulse voltage is applied to the driving terminal, the photosensor cells 1 are maintained in the refresh state. The light information stored in the photosensor cells 1 is erased through the FETs 6.

When the refresh time has elapsed, the photosensor cells 1 are temporarily shielded from light so that a shading time is started.

In this case, the photosensor cells 1 store the dark voltage generated in the dark state. It should be noted that the dark voltage store time is controlled to be equal to the light irradiation store time.

Subsequently, both the dark voltage readout terminal and the first reset terminal are set at H level to reset through the FETs 6 the charges stored in the capacitors 24 during the reset time.

The light information corresponding to the dark voltage components stored in the photosensor cells 1 is read out onto the vertical lines under the following conditions. The dark voltage readout terminal is set at H level, the first reset terminal is set at L level, and the readout pulse voltage Er is applied to the driving terminal. Therefore, the dark voltage signals are stored in the corresponding capacitors 24.

When the dark voltage readout time has elapsed, the dark voltage readout terminal is set at L level, and the first reset terminal is set at H level. The refresh pulse voltage E0 is applied to the driving terminal to set the photosensor cells 1 in the refresh state.

When a predetermined period of time has elapsed, the refresh pulse voltage applied to the driving terminal is set at L level. Therefore, the refresh time is terminated. Along with this, the shading time is ended, and the first reset terminal is set at L level.

Subsequently, clocks are supplied to the scanning circuit 13 to sequentially shift the output pulses from the output terminals 14 thereof. The FETs 10 and 18 are sequentially turned on in response to these timing pulses.

By this horizontal scanning, light information signals are sequentially read out from the capacitors 9 onto the horizontal line 15. In synchronism with the readout operation, the information signals corresponding to the dark voltage components stored in the capacitors 24 are read out onto the output line 19.

In this manner, the light information signals read out onto the horizontal line 15 are output to the external output terminal 17 through the output amplifier 16. The information signals corresponding to the dark voltage components read out onto the output line 19 are output to the external output terminal 21 through the output amplifier 20, so that the output voltage is thus extracted from this external output terminal.

For example, the readout operation for one horizontal scanning time is completed, and the reset time is started. Thereafter, the above operations will be repeated.

Since the photoelectric transducer apparatus of this embodiment is operated as described above, an additional external circuit which was required in the conventional photoelectric transducer apparatus to remove the noise component caused by the dark voltage need not be used, thereby amplifying the system configuration. Therefore, demand for a low-cost photoelectric transducer apparatus can be satisfied.

In the above embodiment, the actual light information signals simultaneously read out onto the corresponding lines and the information signals corresponding to the dark voltage components are amplified by the output amplifiers 16 and 20 in an output circuit 25, and the amplified signals are extracted through the external output terminals, respectively. However, the present invention is not limited to the above arrangement. As shown in FIG. 3, (a third embodiment), the output circuit 25 may be replaced with a differential amplifier 28 to subtract the information corresponding to the dark voltage components from the actual light information. Light information representing a difference may be output from a terminal 29.

In the second and third embodiments, the dark voltage store time is set to be equal to the light irradiation time. However, such setting need not be performed.

For example, by effectively utilizing the relationship between the dark voltage store time and the amount of dark voltage components generated by the photosensor cells 1, i.e., a substantially proportional relationship, the dark voltage store time may be set to be shorter than the light irradiation time, and gains of the output amplifiers 16 and 20 in the output circuit 25 may be independently controlled. Alternatively, the capacitances of the store capacitors 9 and 24 are adjusted to obtain the same effect as in the above embodiments.

In the second and third embodiments, the photosensor cells are one-dimensionally aligned. However, the arrangement of the cells is not limited to this.

As described above, the photoelectric transducer apparatus comprises light information storing means for storing light information read out from the photoelectric transducer element, and dark voltage storing means for storing a voltage corresponding to the dark voltage component read out from the photoelectric transducer element. The actual light information stored in the light information storing means and the information corresponding to the dark voltage component stored in the dark voltage storing means are simultaneously read out from the separate output lines. Therefore, the information corresponding to the dark voltage included in the output can be corrected in units of photosensor cells when the actual optical information read out from the photosensor cell is output, and noise caused by variations in dark voltage can be removed from the output signal. Unlike in the conventional photoelectric transducer apparatus, an additional external circuit is not required to simplify the system configuration. In addition, demand for an economical photoelectric transducer apparatus can be satisfied.

A fourth embodiment of the present invention will be described in detail with reference to the accompanying drawings.

Figure 5:
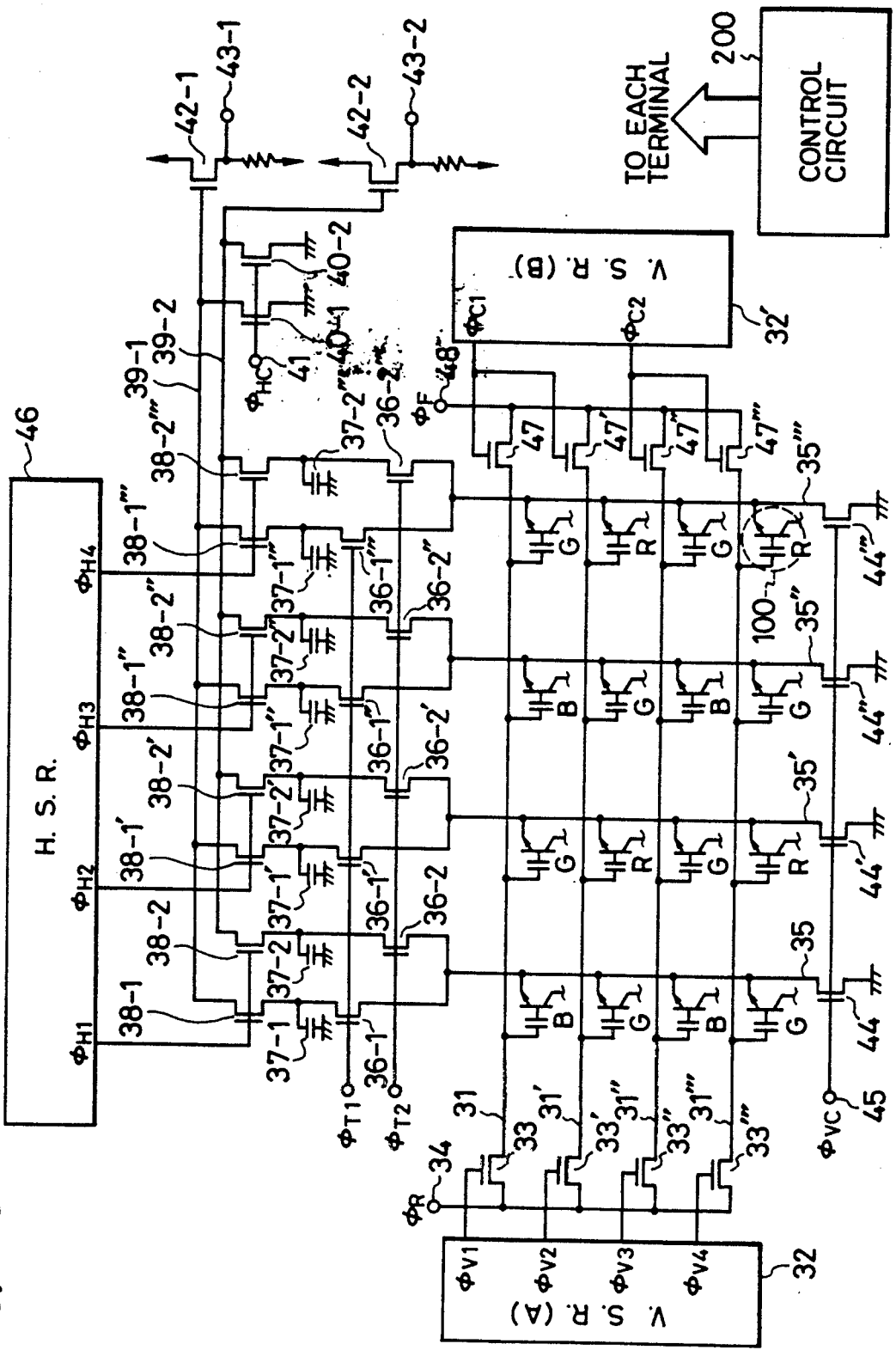
FIG. 5 is a circuit diagram of a photoelectric transducer apparatus according to a fourth embodiment of the present invention.

FIG. 5 is a circuit diagram of photoelectric transducer elements arranged in a 4×4 matrix to constitute a photoelectric transducer apparatus.

The photoelectric transducer apparatus includes: basic photosensor cells 100 (the collector of each bipolar transistor is connected to the substrate and the substrate electrode), horizontal lines 31, 31', 31'', and 31''' serving as the readout-refresh pulse lines; a vertical shift register 32 for generating a readout pulse; buffer MOS transistors 33, 33', 33'', and 33''' arranged between the vertical shift register 32 and the horizontal lines 31, 31', 31'', 31'''; a terminal 34 for applying a pulse $\phi R$ to the drains of the buffer MOS transistors 33, 33', 33'', and 33'''; a vertical shift register 32' for generating a refresh pulse; buffer MOS transistors, 47, 47', 47'', and 47''' formed between the vertical shift register 32' and the horizontal lines 31, 31', 31'', and 31'''; a terminal 48 for applying a pulse to the drains of the buffer MOS transistors 47, 47′, 47″, and 47‴; vertical lines 35, 35′, 35″, and 35‴ serving as vertical readout lines for reading out signal charges from the basic photosensor cells 100; capacitors 37-1, 37-2, 37-1′, 37-1′, 37-1″, 37-2″, 37-1‴, and 37-2‴ for storig these signal charges; transfer MOS transistors 36-1, 36-2, 36-1′, 36-2′, 36-1″, 36-2″, 36-1‴, and 36-2‴ arranged between the vertical lines 35, 35′, 35″, and 35‴ and the capacitors 37-1, 37-2, 37-1′, 37-2′, 37-1″, 37-2″, 37-1‴, and 37-2‴; a horizontal shift register 46 for generating a pulse for selecting each store capacitor; gate MOS transistors 38-1, 38-2, 38-1′, 38-2′, 38-1″, 38-2″, 38-1‴, and 38-2‴ for charging/discharging the store capacitors 37-1, 37-2, 37-1′, 37-1″, and 37-2‴; output lines 39-1 and 39-2 for reading out the store voltages and supplying them to an amplifier; MOS transistors 40-1 and 40-2 for refreshing the charges on the readout lines; a terminal 41 for applying the refresh pulse to the MOS transistors 40-1 and 40-2; transistors 42-1 and 42-2 such as bipolar transistors, MOSFETs or JFETs for amplifying the output signals; output terminals 43-1 and 43-2 of the transistors 42-1 and 42-2; MOS transistors 44, 44′, 44″, and 44‴ for refreshing the charges stored on the vertical lines 35, 35′, 35″, and 35‴; a terminal 45 for supplying a pulse to the gates of the MOS transistors 44, 44′, 44″, and 44‴; a horizontal shift register 46 for turning on the MOS transistors 38-1, 38-2, 38-1′, 38-2′, 38-1″, 38-2″, and 38-2‴; and a control circuit 200, for supplying signals to the respective terminals.

Figure 6:
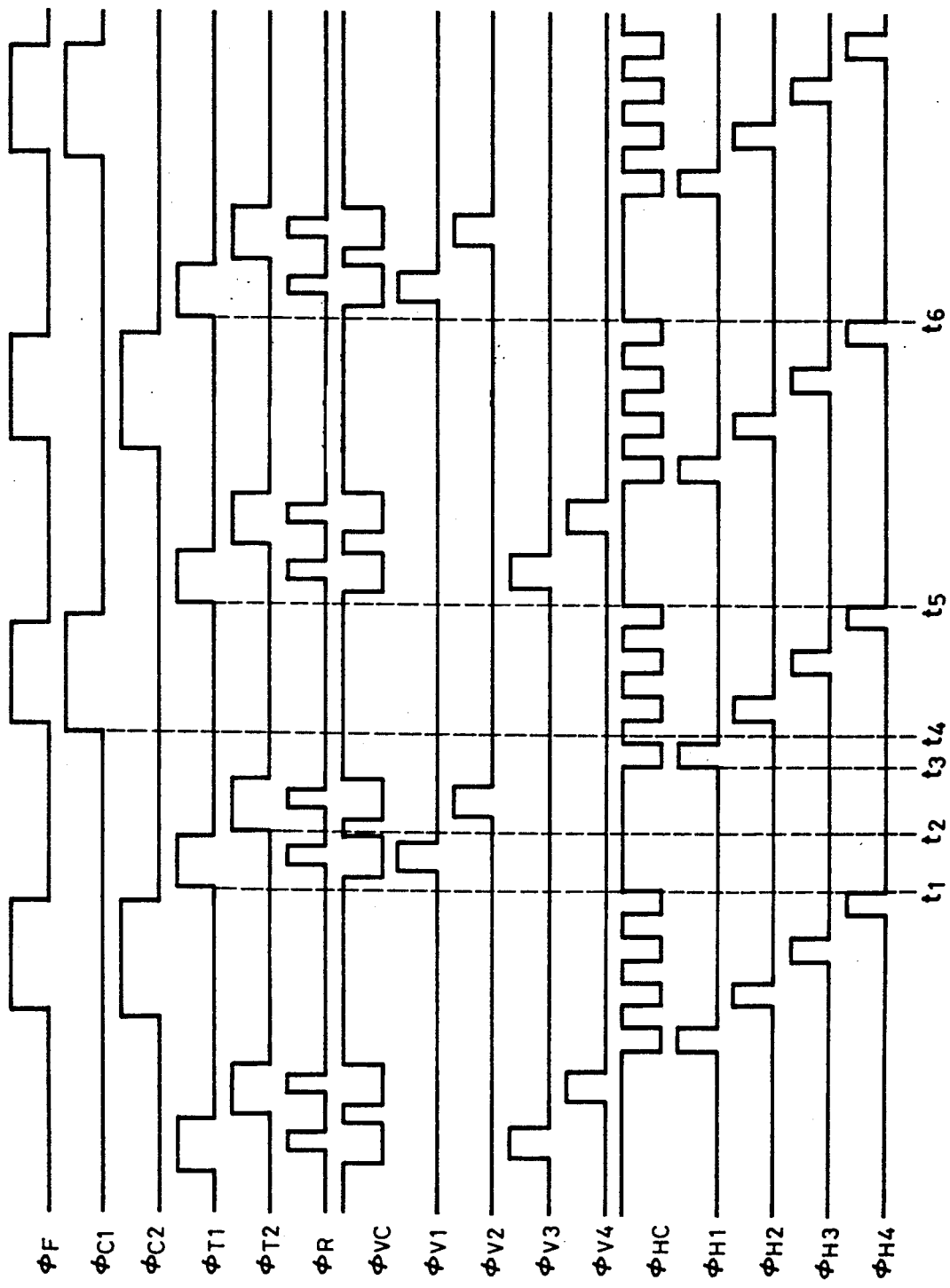
FIG. 6 is a timing chart for explaining the operation of the apparatus in FIG. 5.

The operation of the photoelectric transducer apparatus will be described with reference to FIG. 5 and a timing chart of FIG. 6.

Assume that the collector potential of the photosensor cells is kept at a positive potential in the following description.

The store operation is performed until the t1, and holes corresponding to the amounts of light incident on the photoelectric transducer cells 100 are respectively stored in their p-type base regions.

At time t1, a pulse signal $\phi vc$ rises to turn on the transistors 44, 44′, 44″, and 44‴. A pulse signal $\phi 1$ rises to turn on the transistors 36-1, 36-1′, 36-1″, and 36-1‴ to refresh the store capacitors 37-1, 37-1′, 37-1″, and 37-1‴. A pulse signal $\phi Hc$ rises to turn on the transistors 40-1 and 40-2 to refresh the residual charges on the output lines 39-1 and 39-2. Subsequently, the pulse signal vc falls to turn off the transistors 44, 44′, 44″, and 44‴, and the vertical lines 35, 35′, 35″, and 35‴ and the capacitors 37-1, 37-1′, 37-1″, and 37-1‴ are set in the floating state. A pulse signal $\phi v1$ is output from the vertical shift register 32 to turn on the transistor 33. When a readout pulse signal $\phi R$ is then applied to the terminal 34 and to the horizontal line 31 through the transistor 33, the readout operation of the photoelectric transducer cells 100 of the first row is started. By this readout operation, the readout signals from the cells of the first row appear on the vertical lines 35, 35′, 35‴, and 35‴ and in the store capacitors 37-1, 37-1′, 37-1″, and 37-1‴. When the readout operation is completed, the pulse signal $\phi$TI falls to turn off the transistors 36-1, 36-1′, 36-1″, and 36-1‴. the capacitors 37-1, 37-1′, 37-1″, and 37-1‴ and the vertical lines 35, 35′, 35″ and 35‴ are disconnected, and then the residual charges on the vertical lines 35, 35′, 35″, and 35‴ are refreshed.

At time t2, a pulse signal $\phi$ T2 rises to turn on the transistors 36-2, 36-2′, 36-2″, and 36-2‴ so that the charges in the store capacitors 37-2, 37-2′, 37-2″, and 37-2‴ are refreshed. Subsequently, the pulse signal $\phi vc$ fails to turn off the transistors 44, 44′, 44″, and 44‴. A pulse signal $\phi v2$ is output from the vertical shift register 33′, and the readout pulse signal $\phi R$ is supplied to the horizontal line 31′ through the terminal 34. In this state, the readout operation of the photoelectric transducer cells 100 of the second row is started. By this readout operation, the readout signals from the cells 100 of the second row appear on the vertical lines 35, 35′, 35″, and 35‴ and in the store capacitors 37-2, 37-2′, 37-2″, and 37-2‴. Upon completion of the readout operation for the second row, the pulse signal T2 falls to turn off the transistors 36-2, 36-2′, 36-2″, and 36-2‴, and the capacitors 37-2, 37-2′, 37-2″, and 37-2‴ and the lines 35, 35′, 35″, and 35‴ are disconnected. The pulse signal $\phi vc$ rises to refresh the residual charges from the vertical lines 35, 35′, 35″, and 35‴.

At time t3, the pulse signal $\phi Hc$ falls to turn off the transistors 40-1 and 40-2. The pulse signal $\phi H1$ is output from the horizontal shift register 46 to turn on the transistors 38-1 and 38-2. The charges in the capacitors 37-1 and 37-2 are amplified by the transistors 42-1 and 42-2 through the transistors 38-1 and 38-2 and the output lines 39-1 and 39-2. The amplified signals appear at the terminals 43-1 and 43-2. When this output operation is completed, the pulse signal $\phi Hc$ rises to refresh the output lines 39-1 and 39-2. Subsequently, the pulse signals $\phi H2$ and $\phi H3$ are sequentially output from the horizontal shift register 46. In the same manner as described above, the readout signals from the cell of the first row and the second column and the cell of the second row and the second column and the readout signals from the cell of the first row and the third column and the cell of the second row and the third column are sequentially output from the terminals 43-1 and 43-2. Every time the readout signals appear, the output lines 39-1 and 39-2 are refreshed.

At time t4, a pulse signal $\phi cl$ is output from the vertical shift register 32′ to turn on the transistors 47 and 47′. A pulse signal $\phi F$ is applied to the terminal 48 so that the refresh pulse is applied to the horizontal lines 31 and 31′ through the transistors 31 and 31′. As a result, the refresh operation of the photoelectric transducer cells 100 of the first and second rows is performed.

The readout and refresh operations for the cells 100 of the third and fourth rows are performed at time t5 in the same manner as in the cells of the first and second rows. The readout and refresh operations are repeated for the cells 100 of the first and second rows at time t6. The above operations are repeated.

In the above operation, the time required for sending the readout signal onto the vertical line is the period between rising of the pulse signal $\phi R$ and falling of the pulse signal $\phi T1$, i.e., between the times t1 and t2 when the output from the photoelectric transducer cell 100 of the first row and the first column is assumed. This time interval apparently has a large margin. In the conventional photoelectric transducer apparatus applied in the video camera, the vertical line selected last by horizontal scanning stores the signal charge for about 52.5 $\mu$s. For example, if the time interval between rising of the pulse signal $\phi R$ and falling of the pulse signal $\phi T1$ is set to be 0.5 $\mu$s, the apparatus of this embodiment can be improved by about 105 times (40 dB) for blooming and smearing, as compared with the conventional apparatus.

Since the store capacitors are arranged, the photosensitive transducer cells are disconnected from the store capacitors by turning off the transistors 36-1, 36-2, 36-1′, 36-2′, 36-1″, 36-2″, 36-1‴, and 36-2‴ after the signal charges are stored in the store capacitors, the photoelectric transducer cells 100 can be sufficiently refreshed. For example, the refresh time may be a time interval between times t3 and t5, i.e., one horizontal scanning cycle. Therefore, the after image phenomenon can be reduced as compared with the conventional case.

If the photoelectric transducer apparatus is applied to a color video camera and color filters are formed on the sensor cells, the number of capacitors is that of the colors of column cells, and the operation as described above is performed. In this case, only one vertical line is used for each column, and the aperture of the sensor cells is not reduced. For example, as shown in FIG. 5, the color filters R, G, and B are arranged according to the Bayer's scheme, and the cells are operated at the timings shown in FIG. 6. B signals are stored in the capacitors 37-1 and 37-1″, G signals are stored in the capacitors 37-2, 37-1′, 37-2″, and 37-1‴, and R signals are stored in the capacitors 37-2′ and 37-2‴, respectively.

In the above embodiment, the two vertical lines are simultaneously accessed. However, the number of lines is not limited to two, but can be extended to three or more. In this case, the number of store capacitors is that of vertical pixels which are simultaneously accessed.

Figure 7:
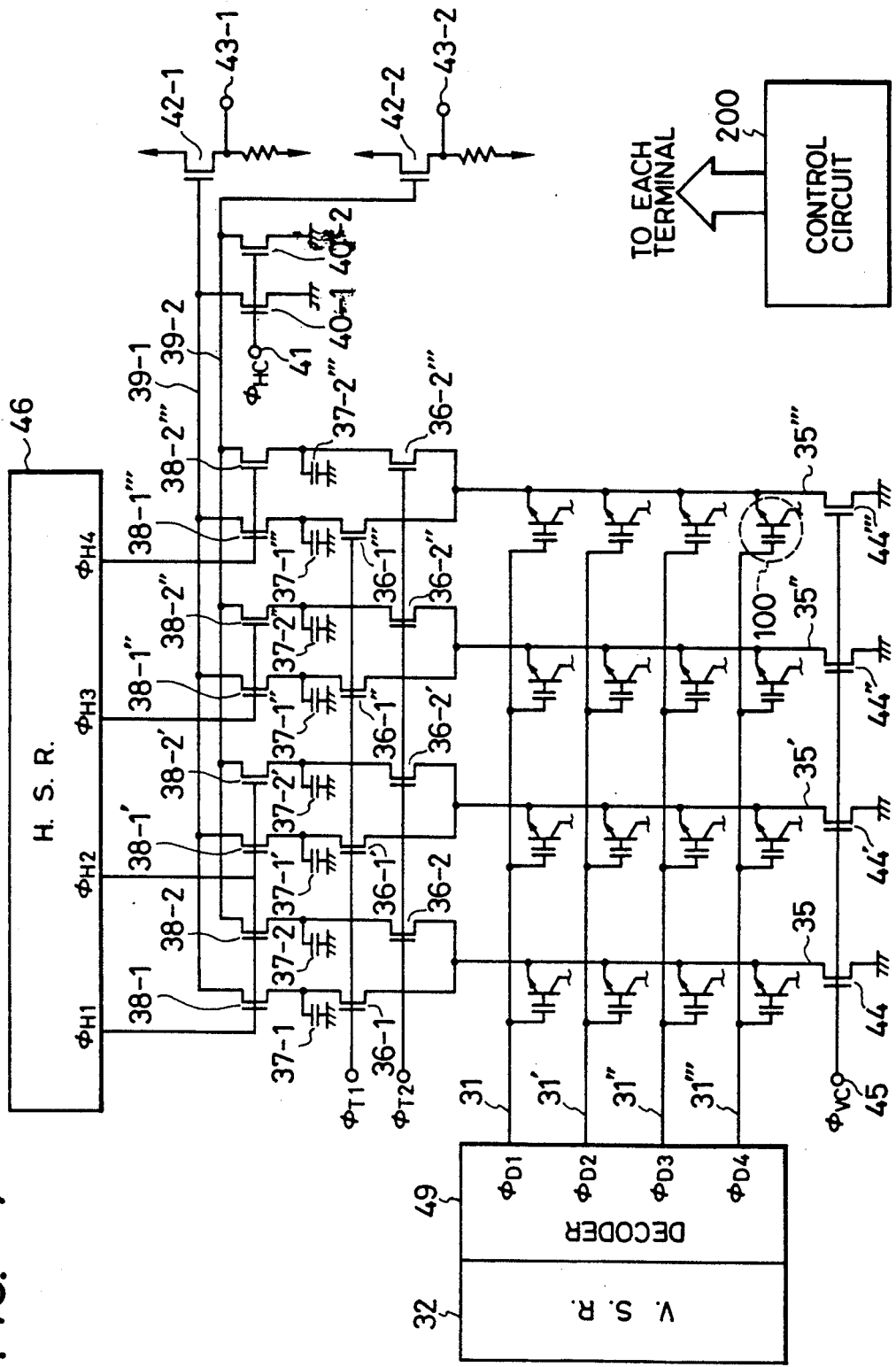
FIG. 7 is a circuit diagram of a photoelectric transducer apparatus according to a fifth embodiment of the present invention.

FIG. 7 is a circuit diagram showing a fifth embodiment of the present invention. A decoder 49 is arranged between a vertical shift register 32 and horizontal lines 31, 31′, 31″, and 31‴, and a control circuit 200 is operated at timings shown in FIG. 8.

In this embodiment, the decoder 49 also serves the function of the photoelectric transducer cell refresh vertical register 46 of the fourth embodiment (FIG. 5), thereby further simplifying the system configuration.

Figure 8:
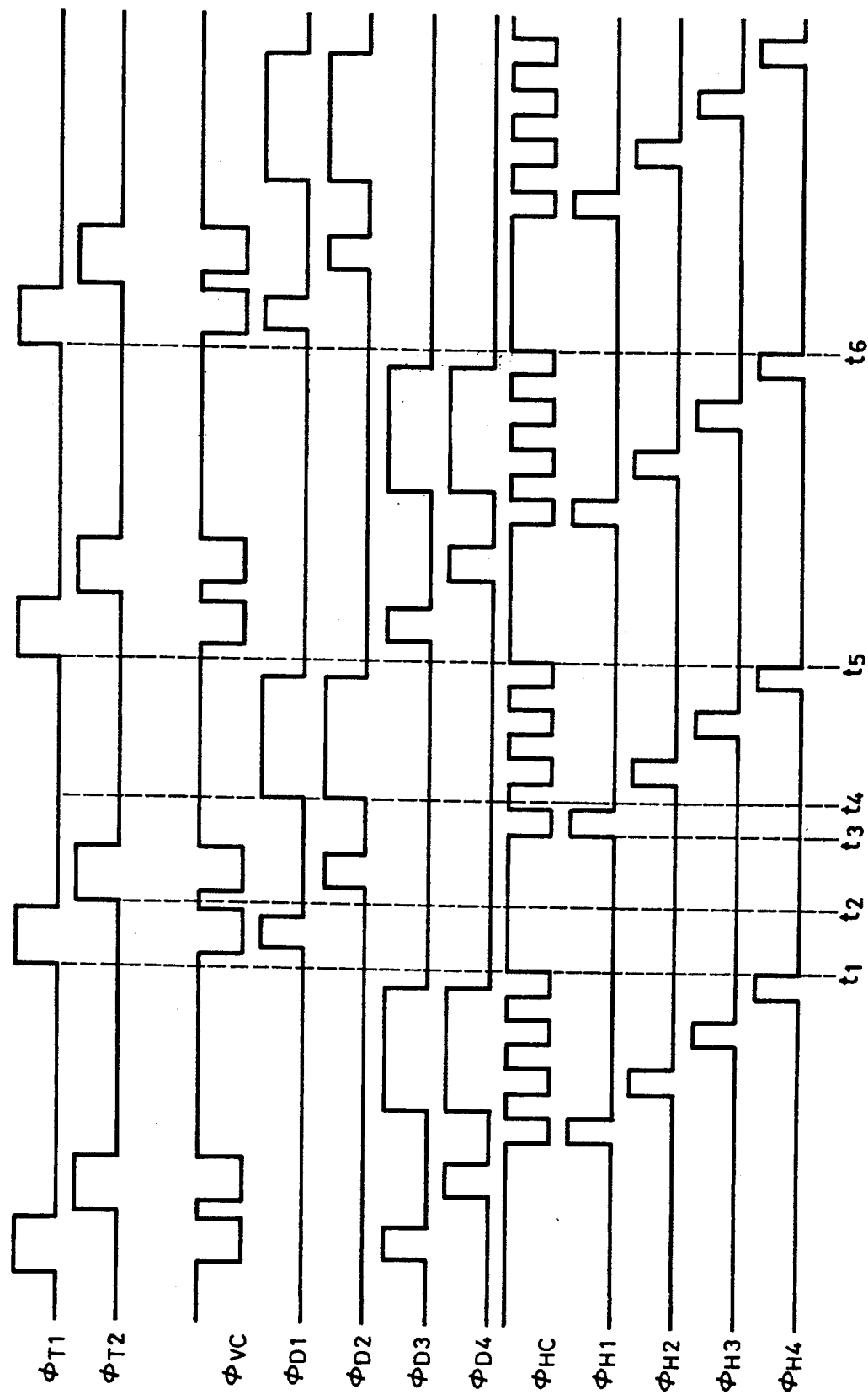
FIG. 8 is a timing chart for explaining the operation of the apparatus in FIG. 7.

The operation of the fifth embodiment will be described with reference to the timing chart of FIG. 8. Assume that the store operation is performed until time t1, and that the holes corresponding to the amounts of light incident on the photoelectric transducer cells 100 are respectively stored in their p-type base regions.

At time t1, a pulse signal $\phi vc$ has already risen, the vertical lines have already been grounded, and a pulse signal $\phi T1$ rises to refresh the charges of the capacitors 37-1, 37-1′, 37-1″, and 37-1‴. Thereafter, when the pulse signal $\phi vc$ falls to set the vertical lines and the capacitors in the floating state, the decoder 49 outputs a pulse $\phi D1$.

The signals from the photoelectric transducer cells 100 of the first row appear on the vertical lines and in the capacitors 37-1, 37-1′, 37-1″, and 37-1‴. After the readout operation is completed, the pulse signal $\phi T1$ falls to disconnect the capacitors 37-1, 37-1′, 37-1″, and 37-1‴ from the vertical lines, and the pulse signal $\phi vc$ rises again to refresh the vertical lines. The pulse signal $\phi T2$ rises to refresh the capacitors 37-2, 37-2′, 37-2″, and 37-2‴, and the pulse signal $\phi vc$ then falls. When the pulse signal $\phi D2$ rises again, the signals from the photoelectric transducer cells of the second row appear on the vertical lines and the capacitors 37-2, 37-2′, 37-2″, and 37-2‴. Thereafter, the pulse signal $\phi T2$ falls and the pulse signal $\phi vc$ rises to refresh the vertical lines. In this state, the signals from the first row are stored in the capacitors 37-1, 37-1′, 37-1″, and 37-1‴, and the signals from the second row are stored in the capacitors 37-2, 37-2′, 37-2″, and 37-2‴.

In the same manner as in the first embodiment, these stored signals are sequentially read out from time t3 to time t5. In this case, during the time interval from time t4 to time immediately before time t5, the pulse signals $\phi D1$ and $\phi D2$ are set at high level, so that the photoelectric transducer cells 100 of the first and second rows are refreshed.

The readout and refresh operations of the photoelectric transducer cells of the third and fourth rows are performed in the same manner as described above.

According to this embodiment, the refresh and readout operations of the photoelectric transducer cells are performed by using a single vertical shift register, thereby simplifying the system configuration.

In the above embodiment, the two output lines are used. However, the number of output lines may be three or more. For example, as shown in a sixth embodiment of FIG. 9, four output lines are used in units of colors of filters. In this case, the load of the output lines can be reduced into ½ of the two output lines. In addition, an image processing circuit can also be simplified.

Figure 9:
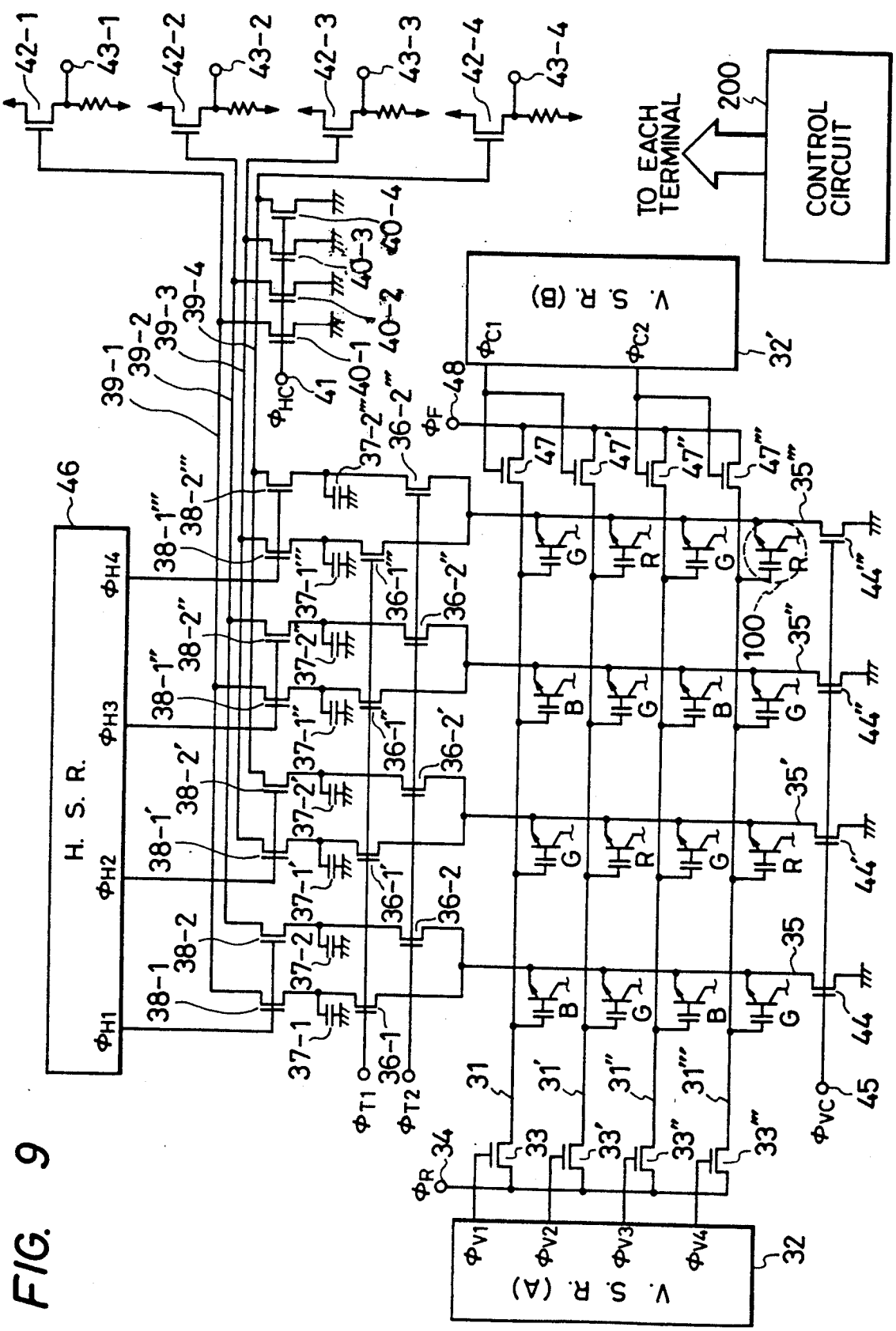
FIG. 9 is a circuit diagram of a photoelectric transducer apparatus according to a sixth embodiment of the present invention.

The arrangement of FIG. 9 is different from that of FIG. 5 in the following points. Output lines 39-3 and 39-4 are added. Transistors 38-1 and 38-1‴ are connected to a transistor 39-3 instead of the transistor 39-1. Transistors 38-2′ and 38-2‴ are connected to a transistor 39-4 instead of the transistor 39-2. Transistors 40-3 and 40-4, the gates of which are commonly connected to the gates of transistors 40-1 and 40-2, are added to refresh the output lines 39-3 and 39-4. A transistor 42-3 for outputting a signal from the output signal 39-3, an output terminal 43-4, a transistor 42-4 for outputting a signal from the output line 39-4, and an output terminal 43-4 are added.

Other arrangements of FIG. 9 are the same as those of FIG. 5, and the same reference numerals as in FIG. 5 denote the same parts in FIG. 9.

In the photoelectric transducer apparatuses in the fourth to sixth embodiments as described above in detail, a plurality of capacitors are arranged for each readout line of the photoelectric transducer cells. The signal charges can be stored in the capacitors in a short period of time, and then the readout lines can be disconnected therefrom. Therefore, blooming and smearing caused by the presence of the signal charges on the readout lines can be completely prevented.

Furthermore, since the refresh time can be sufficiently prolonged, the after image phenomenon can be effectively prevented.

Many lines are often simultaneously accessed when the photoelectric transducer apparatus is applied to a color video camera or the like. The capacitors corresponding to the pixels to be accessed are arranged for each readout line. The number of readout lines need not be increased, and thus the aperture can be increased.

A seventh embodiment of the present invention will be described below.

Figure 10:
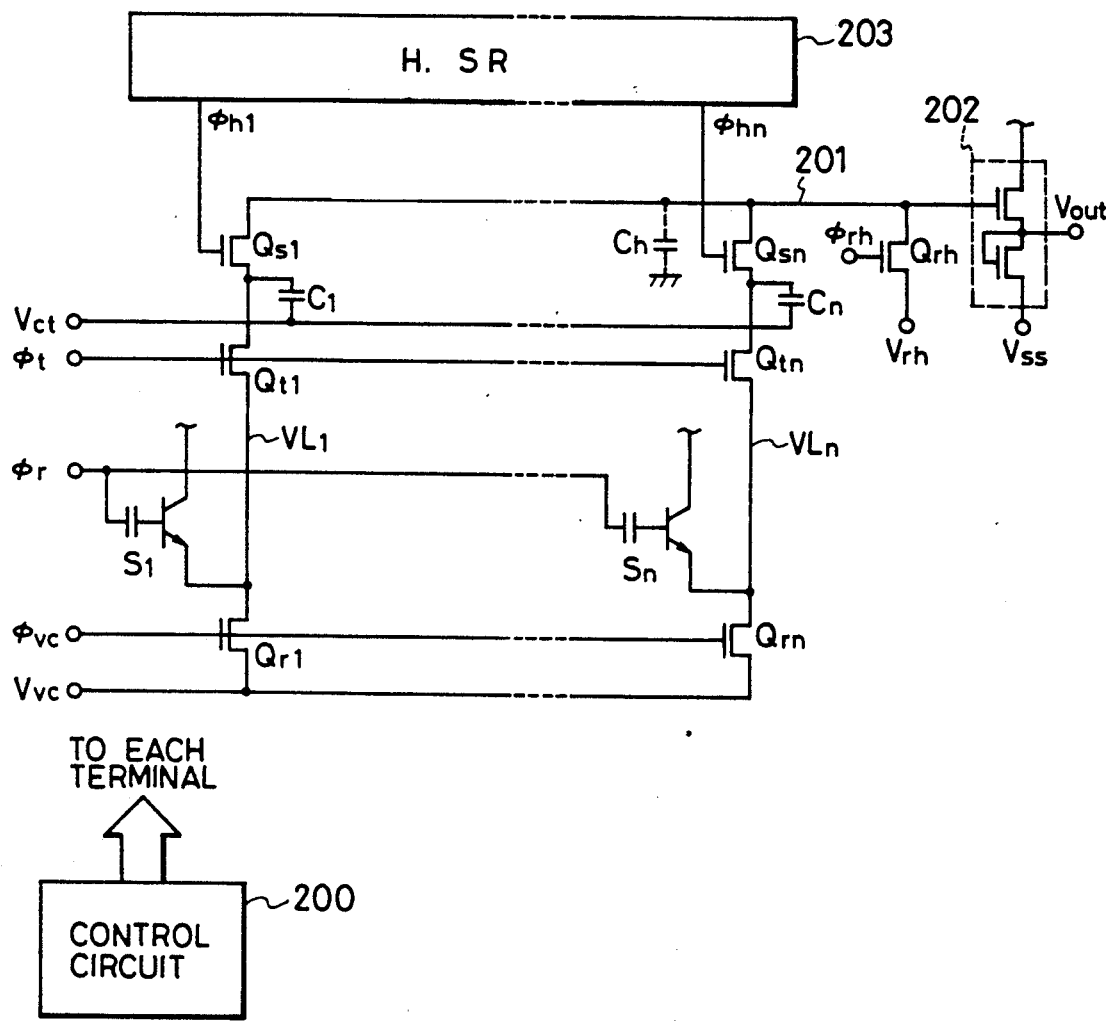
FIG. 10 is a circuit diagram of a photoelectric transducer apparatus according to a seventh embodiment of the present invention.

FIG. 10 is a circuit diagram of a photoelectric transducer apparatus according to the seventh embodiment of the present invention.

Referring to FIG. 10, a driving pulse $\phi R$ is applied from a control circuit 200 to capacitor electrodes of photoelectric transducer cells S1 to Sn. A predetermined positive voltage is applied to the collector electrodes of the cells S1 to Sn. The emitter electrodes of the cells S1 to Sn are respectively connected to vertical lines VL1 to VLn. Each of these vertical lines is connected to one terminal of a corresponding one of store capacitors C1 to Cn (each having a capacitance Ct) through a corresponding one of transistors Qt1 to Qtn. The other terminal of each of the capacitors C1 to Cn properly receives a bias voltage Vct in a manner to be described later.

One terminal of each of the capacitors C1 to Cn is connected to an output line 201 through a corresponding one of transistors QS1 and QSn. The output line 201 has a stray capacitance Ch equal to the capacitance Ct of each of the store capacitors C1 to Cn.

The input terminal of an output amplifier 202 is connected to the output line 201 and to a transistor Qrh for properly applying a reset voltage Vrh. The value of the reset voltage Vrh is selected within the range wherein the linearity of the output amplifier 202 is not degraded. In this embodiment, the range is 1.5 to 3.5 V. The output amplifier 202 is connected to a single power source and is driven thereby.

Pulses $\phi h1$ to $\phi hn$ are sequentially applied from a scanning circuit 103 to the gate electrodes of the transistors QS1 and QSn. A pulse $\phi t$ is applied to the gate electrodes of the transistors Qt1 to Qtn.

Figure 11:
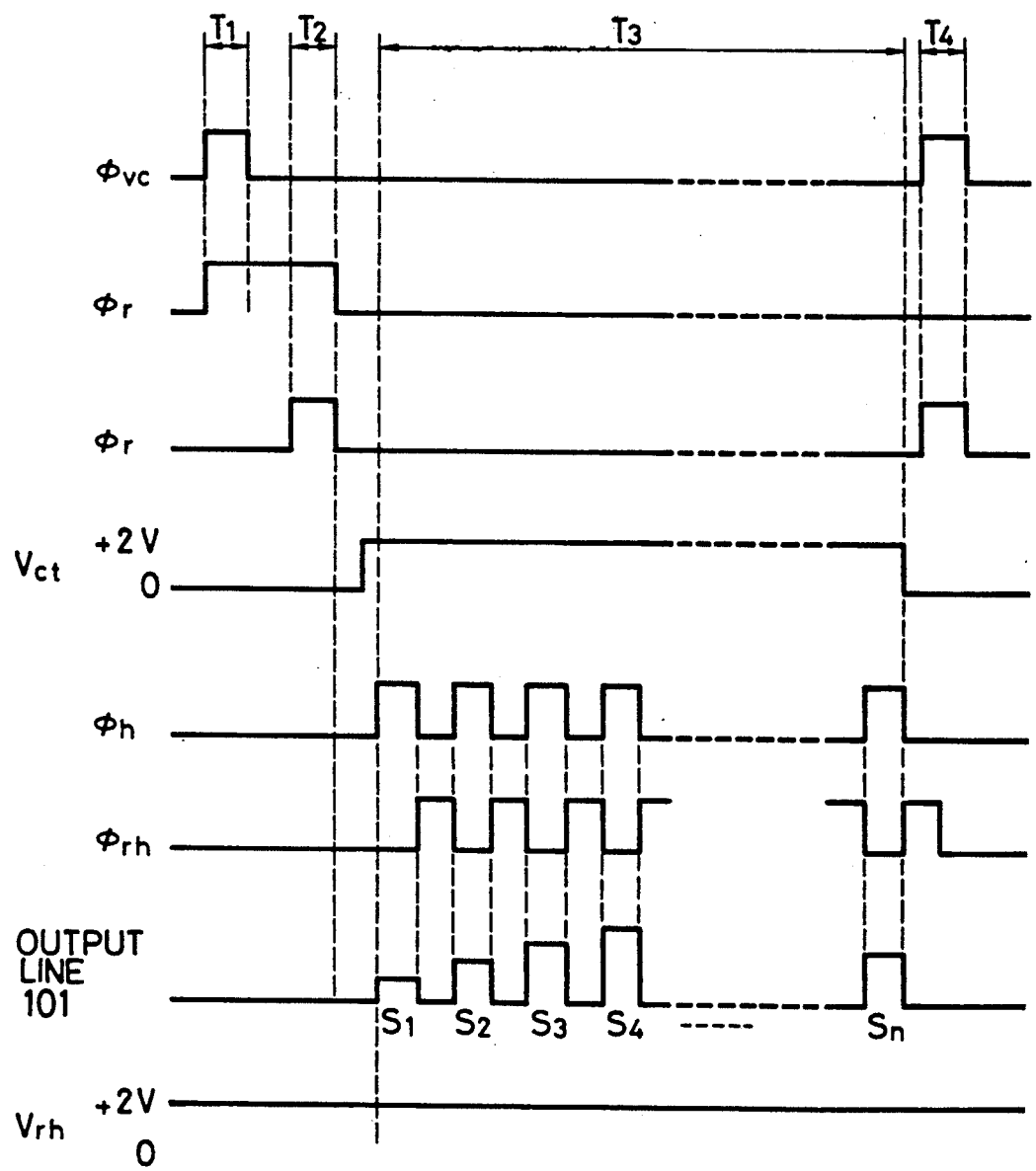
FIG. 11 is a timing chart for explaining the apparatus in FIG. 10.

A voltage Vvc is applied to the respective vertical lines through transistors Qr1 to Qrn. The gate electrodes of these transistors receive a pulse $\phi vc$. A control circuit 200 supplies a driving pulse of each terminal. FIG. 11 is a timing chart for explaining the operation of the control circuit.

The transistors Qr1 to Qrn and the transistors Qt1 to Qtn are turned on in response to the pulses $\phi vc$ and $\phi t$, respectively, to clear (duration T1) the capacitors C1 to Cn. Subsequently, the pulse $\phi vc$ is set at L level, and the capacitors C1 to Cn are charged (duration T2) with the readout signals from the photoelectric transducer cells in response to the driving pulse $\phi r$. In this case, the bias voltage Vct is the ground potential.

After the bias voltage Vct is set to be +2V, the signals from the capacitors C1 to Cn are output at timings of the shift pulses $\phi h1$ to $\phi hn$.

More specifically, the transistor QS1 is turned on in response to the pulse $\phi h1$. As described above, the signal read out from the photoelectric transducer cell S1 and stored in the capacitor C1 is read out onto the output line 201. Subsequently, the transistor Qrh is turned on in response to the pulse $\phi rh$, and the output line 201 is reset to the reset voltage Vrh (e.g., +2V). In the same manner as described above, the readout signals stored in the capacitors C2 to Cn are sequentially read out onto the output line 101 and are output through the output amplifier 102 (a duration T3).

When the output operation is completed, the refresh operation is performed in response to the pulse $\phi vc$ and the driving pulse $\phi r$ (a duration T4).

The basic operation of the circuit in FIG. 10 will be described below.

Figure 12A:
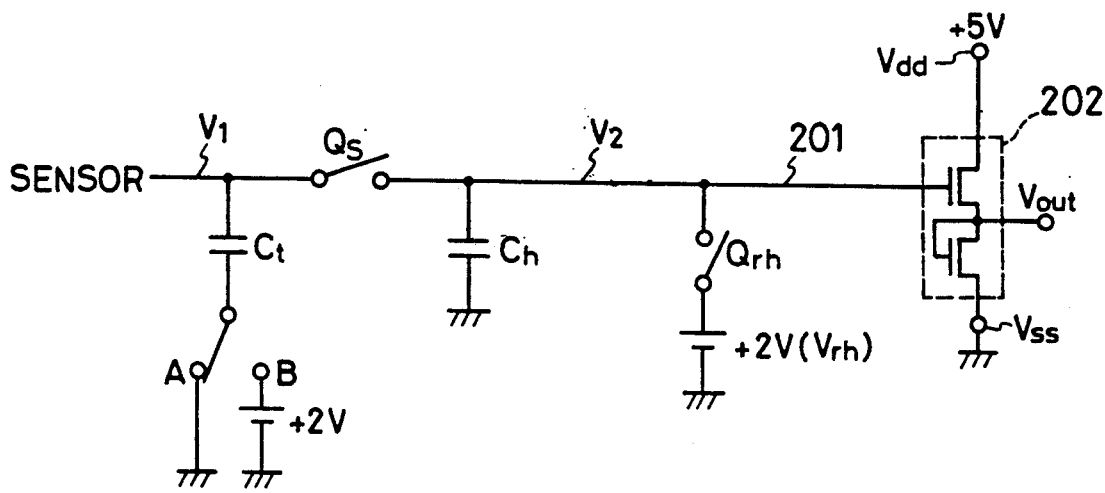
FIG. 12A is a circuit diagram for explaining a basic operation of the seventh embodiment of the present invention.
Figure 12B:
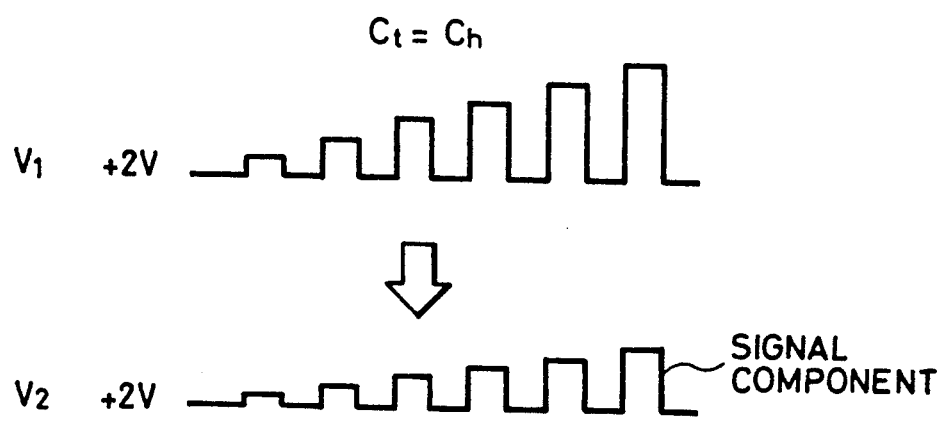
FIG. 12B is a timing chart showing the voltage waveforms in the seventh embodiment.

FIG. 12 A is a circuit diagram for explaining the basic operation of the circuit in FIG. 10, and FIG. 12 B is a timing chart showing the voltage waveforms.

Referring to FIG. 12 A, a switch for selecting the ground voltage (contact A) or the bias voltage of +2V (contact B) is equivalently connected to the store capacitor Ct. A switch Qrh for applying the reset voltage Vrh (+2V) is equivalently connected to the output line 201. Also assume that the voltage of the capacitor Ct is v1, and that the voltage of the output line 201 is v2.

The capacitor Ct is connected to the contact A and grounded, and the readout signal from the sensor is stored in the capacitor Ct. The capacitor Ct is then connected to the contact B and receives the bias voltage of +2V. The voltage of the capacitor Ct at the time of a zero level of the readout signal is set to be equal to the reset voltage of the output line.

Subsequently, when the switch Qs is closed, the ½ component of the signal of the voltage v1 appears on the output line 201 since Ct=Ch. This voltage is input as a voltage V2 to the output amplifier 202. Closing of the switch Qrh causes resetting of the output line 201 at the voltage of +2V (FIG. 12 B).

According to this embodiment, only the signal component is input to the output amplifier 102, and the input voltage does not greatly vary upon resetting. The dynamic range of the output amplifier 202 can therefore be increased. The amplitude of the voltage Vrh or Vct can have a large margin.

By setting the potential of the output line 201 connected to the input terminal of the output amplifier 202 at a low potential excluding the ground potential, the Vss terminal of the output amplifier 202 can be grounded and a positive voltage (+5V in this case) can be applied to the Vdd terminal thereof by a single power source. (For example, if the reset potential is zero, the negative and positive potentials are respectively applied to the Vss and Vdd terminals, and thus two power sources are required).

If the bias voltage of the capacitor Ct is not changed, the potential of the output line 201 greatly varies between the reset potential Vrh and the signal component potential of the readout signal. The sensor signal is normally amplified to a proper signal level by a signal processor (to be described later). If the above unnecessary component is generated, the circuit system is saturated since the unnecessary component has a magnitude larger than that of the signal component, thereby degrading the signal component. However, according to the above embodiment, the above problem does not occur. If an output amplifier having a wide dynamic range is arranged, it prevents use of a low-level driving source and design of a compact imaging device. However, according to this embodiment, the wide dynamic range of the amplifier 202 is not required, so that a compact imaging device can be provided.

Now assume the charge/discharge time. A reset potential portion of the output signal Vout can sufficiently drive a load capacitance (a bonding capacitance, a wiring capacitance, an input transistor capacitance, and the like) by a source current of a source follower circuit. However, the signal component portion of the output signal becomes a sink current of the source follower circuit. If an output resistance is not sufficiently small, a discharge time constant is increased to degrade linearity of a small signal. A decrease in output resistance causes current consumption loss. According to this embodiment, since the dynamic range of the output amplifier can be narrowed, this problem does not occur.

In order to eliminate the unnecessary voltage variation component, a sample/hold (S/H) circuit is required. The relationship between a timing pulse for the S/H circuit and the signal component is very important. It is desirable not to arrange the S/H circuit to obtain good temperature characteristics and the power source voltage characteristics. However, if the S/H circuit is not arranged, the blocking characteristic curve of a low-pass filter becomes steep when the output signal is band-limited thereby, and hence image quality is degraded However, according to this embodiment, since the S/H circuit need not be used, the apparatus of this embodiment can be stably operated against temperature and voltage variations.

Figure 13:
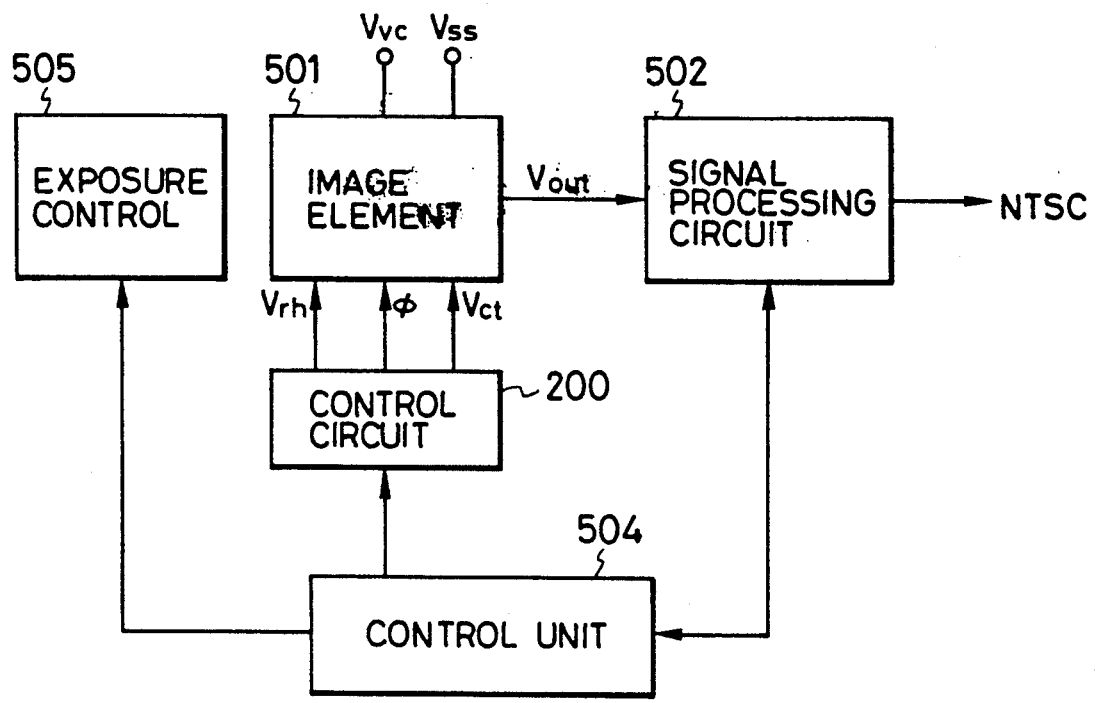
FIG. 13 is a block diagram of an imaging device on the basis of the above embodiments of the present invention.

FIG. 13 shows a schematic arrangement of an imaging device using the above embodiment.

Referring to FIG. 13, an imaging element 501 has the same arrangement as in the embodiment of FIG. 10. An output signal Vout from the imaging element 501 is gain-controlled by a signal processing circuit 502 and is output as a standard NTSC signal or the like.

Various pulses $\phi$ and the bias voltage Vct for driving the imaging element 501 are generated by a control circuit 200. The control circuit 200 is operated under the control of the control unit 504. In this case, the control circuit 200 also serves as the switching means for properly applying the bias voltage Vct. The control unit 504 controls the gain or the like of the signal processing circuit 502 on the basis of the output from the imaging element 501 to control the amount of light incident on the imaging element 501.

The bias voltage Vct applied to the store capacitors C1 to Cn is supplied from the control circuit 200. However, an internal power source 601 shown in FIG. 14, may be arranged. In this case, the internal power source 601 is operated in response to a control pulse $\phi$ct from the control unit 504 to generate the bias voltage Vct.

In the photoelectric transducer apparatus as described in detail, a simple method of temporarily changing the reference potential of the capacitors in the readout mode is employed, so that only a single power source for the imaging driving voltage can be used. As a result, the imaging device can be made more compact with lower power consumption

We claim:

1. A photoelectric transducer apparatus including:

photoelectric transducer cells arranged in rows and columns for forming an electric signal in response to incident light, each cell being capable of being non-destructively read out;

readout signal lines for reading out the electric signal from said photoelectric transducer cells;

a plurality of storing means connected to each of said signal lines for temporarily storing the electric signal from said photoelectric transducer cells; and control means for introducing each electric signal formed in one predetermined row of said cells through one of said signal lines to one of said plurality of storing means connected to said one signal line and thereafter introducing each electric signal formed in another row of said cells through said one signal line to another one of said plurality of storing means connected to said one signal line and thereafter clearing the predetermined two rows of said cells.

* * * * *

UNITED STATES PATENT AND TRADEMARK OFFICE
CERTIFICATE OF CORRECTION

PATENT NO. : 5,019,702

DATED : May 28, 1991

INVENTOR(S) : Hayao Ohzu, et al.

Figure 14:
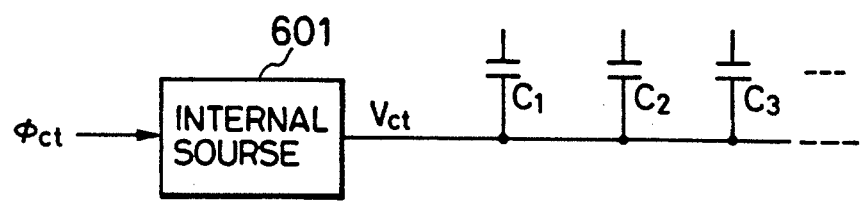
FIG. 14 is a circuit diagram showing part of an eighth embodiment of the present invention.

It is certified that error appears in the above-identified patent and that said Letters Patent is hereby corrected as shown below:

IN THE DRAWINGS:

Sheet 13, Fig. 14, "Sourse" should read --Source--.

Column 1

Line 8, "now abandoned" should be deleted.

Column 2

Line 11, "to result" should read --resulting--.
Line 65, "comprising" should read --comprising:--.

Column 3

Line 29, "comprising," should read --comprising:--.

Column 5

Line 64, "Fig. 3" should read --Fig. 3A--.

UNITED STATES PATENT AND TRADEMARK OFFICE
CERTIFICATE OF CORRECTION

PATENT NO. : 5,019,702

DATED : May 28, 1991

INVENTOR(S) : Hayao Ohzu, et al.

It is certified that error appears in the above-identified patent and that said Letters Patent is hereby corrected as shown below:

Column 5

Line 66, "Fig. 3," should read --Fig. 3A,--.

Column 6

Line 13, "FETs 100" should read --FETs 10--.

Column 8

Line 6, "Fig. 3," should read --Fig. 3B,--.

Column 9

Line 5, "37-1'," (2nd occurrence) should read --37-2',--.

Line 6, "storig" should read --storing--.
Line 14, "37-1"', and" should read --37-2', 37-1", 37-2", 37-1"', and--.

UNITED STATES PATENT AND TRADEMARK OFFICE
CERTIFICATE OF CORRECTION

PATENT NO. : 5,019,702

DATED : May 28, 1991

INVENTOR(S) : Hayao Ohzu, et al.

It is certified that error appears in the above-identified patent and that said Letters Patent is hereby corrected as shown below:

Column 9

Line 37, "t1," should read --time t1,--.
    Line 42, "signal $\phi$1" should read --signal $\phi$T1--.
    Line 48, "nal vc" should read --nal $\phi$vc--.
    Line 58, "35'"," should read --35",--.
    Line 62, "the" should read --The--.

Column 10

Line 2, "fails" should read --falls--.
    Line 12, "signal T2" should read --signal $\phi$T2--.
    Line 42, "transistors 31 and 31'," should read
      --transistors 33 and 33'.--.

Column 13

Line 49, "output line 101" should read --output
      line 201--.

UNITED STATES PATENT AND TRADEMARK OFFICE
CERTIFICATE OF CORRECTION

PATENT NO. : 5,019,702

DATED : May 28, 1991

INVENTOR(S) : Hayao Ohzu, et al.

It is certified that error appears in the above-identified patent and that said Letters Patent is hereby corrected as shown below:

Column 13

Line 50, "output amplifier 102" should read --output amplifier 202--.

Column 14

Line 12, "output amplifier 102," should read --output amplifier 202,--.

Line 67, "graded" should read --graded.--.

Signed and Sealed this

First Day of December, 1992

*Attest:*

DOUGLAS B. COMER

*Attesting Officer*   *Acting Commissioner of Patents and Trademarks*